United States Patent [19]

Nichols

[11] Patent Number: 5,597,103
[45] Date of Patent: Jan. 28, 1997

[54] RACK WITH CONVOLUTED MAIN MEMBERS FOR PICKUP TRUCKS

[76] Inventor: Kenneth E. Nichols, P.O. Box 528, Carson City, Nev. 89702-0528

[21] Appl. No.: 241,038

[22] Filed: May 11, 1994

[51] Int. Cl.$^6$ .................................................. B60P 7/06
[52] U.S. Cl. .......................... 224/324; 224/403; 224/311; 296/3
[58] Field of Search .................... 224/311, 315, 224/324, 325, 326, 309; 296/3; 200/402, 403

[56] References Cited

U.S. PATENT DOCUMENTS

| | | | |
|---|---|---|---|
| 2,480,353 | 8/1949 | Bjork | 224/315 X |
| 4,267,948 | 5/1981 | Lewis | 296/3 X |
| 4,378,127 | 3/1983 | Rossi, Sr. | 296/3 |
| 4,676,543 | 6/1987 | Lewis | 296/3 |
| 4,827,742 | 5/1989 | McDonald | 224/315 X |
| 5,172,952 | 12/1992 | Lasnetski | 224/311 X |
| 5,344,020 | 9/1994 | Ferguson | 224/311 X |
| 5,381,939 | 1/1995 | Tippets | 224/324 X |

FOREIGN PATENT DOCUMENTS

| | | | |
|---|---|---|---|
| 2356739 | 5/1975 | Germany | 224/311 |
| 3149422 | 7/1982 | Germany | 224/324 |
| 136940 | 6/1991 | Japan | 224/311 |

OTHER PUBLICATIONS

1990 Knaack Mfg. Co. Part No. 78-1013 Product Brochar Weather Guard.

Leggett & Platt Inc. Masterack® Division (No Date). 905 Memorial Drive, SE. Atlanta, Georgia 30348 404/525-5501.

*Primary Examiner*—Renee S. Luebke

[57] ABSTRACT

A tool and material restraining platform for pickup trucks, which utilizes steel extruded into convoluted channels as the bed of the platform. Self-locking hardware devices are inserted therein, to provide a secure base from where chain link is placed under tension to restrain tools and materials of simple or complex and difficult shapes. This results in more reliable restraining methods than strapping, stretch cords, and ropes and the like. Furthermore, the hardware devices, adapt easy to use add-on and take-off options such as a rigid conduit container. In addition, the sides of the platform are made of aluminum for displaying unique patterns, logos, and custom designs, to achieve an enhanced appearance for the truck, as custom wheels do. Also in addition, for models equipped for use with truck bed caps, tool and material cradles are installed in the interior of the cap, to the mounting bolts of the platform, to utilize normally wasted space directly adjacent to the ceiling of the cargo cap.

8 Claims, 7 Drawing Sheets

RACK WITH CONVOLUTED MAIN MEMBERS FOR PICKUP TRUCKS

BACKGROUND-FIELD OF THE INVENTION

This invention relates to land vehicles, in particular, light duty pickup trucks. More specifically, to transporting items over the top of the cargo bed and cab. Particular attention is drawn to not merely successfully transporting items, but successfully restraining a full spectrum of items hauled through adverse driving conditions and situations.

BACKGROUND-DISCUSSION OF PRIOR ART

A variety of after-market accessories have evolved for the top of the cargo boxes on pickup trucks. Many light duty truck owners have added after-market racks to transport tools and materials that are too long to fit inside the cargo bed. A typical example is that of Delmous Lewis, U.S. Pat. No. 4,676,543 (1987). Shown is a pipe framework assemblage providing tubular cross members. The only methods implied by this rack for securing anything to it are tying rope, strapping, "Bungee" or stretch cords, or tarp tie downs or the like.

Some racks offer a way to carry a particular type of ladder, but not all types or combinations of several. A rack made by Leggett & Platt Inc. called "Masterack" manufactured in Atlanta, Ga., fits this category. A very limited variety of items can be hauled on this rack.

And so the reader begins to see, conventional "racks" in general have provided a way to "haul" items on pickup trucks; however, two basic categories of deficiencies begin to emerge into which they all fall. Unfortunately, these deficiencies only become apparent after the item or items are successfully "hauled" to the point where the rack and tie-down methods fail to "restrain" the items in unforseen situations such as high winds or emergency maneuvers.

The first category is a pipe framework assemblage with tubular bed rails which can only provide that any attempt at restraining items be a complex and uncertain multi-step process. The user must assess: how to secure the load to the tubular bars; what he or she has at their disposal to use for the task; his or her skill at tying knots if it is rope; will the thing hold the load from shifting considering how far the load is to be taken; and has he or she successfully provided for an unforseen situation like a panic stop or a sudden wind gust?.

The commonly accepted and practiced method to attempt to restrain items on this category of rack, is to wrap rope around the rack and the item to be hauled. Of course, the failures of this method are the knots and shifting of the load. Unskilled individuals often produce results that are haphazard at best.

In conclusion, this category of rack fails to truly address providing a fundamentally sound foundation for successfully restraining a wide variety of items through a considerable range of diverse driving conditions and situations.

The second category of rack is a similar tubular framework assemblage with an apparatus incorporated into the design of a rack that usually does a fair job to restrain a ladder. However, when the situation arises with an item not configured to fit in the apparatus is placed on the rack, the situation reverts back to the conditions of the first category of rack. In conclusion, the second category of rack is very limited or confined in its nature to a specifically configured item.

However, the issue of alarming concern, is the use of "Bungee" or stretch cords, and tarp tie downs used for hauling items on these racks. These flimsy devices were never intended for, nor should they ever be used for, the task for which they have been assigned. They age and fatigue quickly, decay from ultra violet exposure, and are far less reliable than they are believed to be.

The wire hooks at either end of these devices are weak and often succumb to forces beyond their material design. They suffer deformation of shape and lose what little ability they possessed to hold. They are buffeted wildly in rapid air movement and become dislodged from the item and apparatus they were in company with, leaving items more compromised with little chance of being restrained should overwhelming forces be exerted on them.

Conclusively, it is clearly a faulty design and an illsuited apparatus that creates the demand for employment of these unreliable methods and devices. Serious consequences have been suffered from failures that have occurred from use of these deficient methods and devices.

SUMMARY OF OBJECTS AND ADVANTAGES OF THIS INVENTION

Accordingly, having a clearer awareness of the inherent dangers and circumstances to contend with when transporting items this way, it will become clear to the reader the herein disclosed invention by its nature of design, has clearly achieved the status of a true all-purpose restraining platform system. This restraining system combines tried, successful, and desirable qualities, with new and unique mechanically sound features. These features are needed to form a complete and reliable system that can restrain a full spectrum of items through an entire range of driving conditions and situations. This invention succeeds to dramatically reduce inherent dangers in the two before-mentioned deficiency categories of the prior art.

The first category deficiency is solved with a restraining platform system that provides convoluted channel bed rails from which mechanically sound methods develop and from which the invention evolves. Deficient restraining medium and methods are replaced with chain link, placed under leveraged tension, solving the problems of lasting durability, while retaining the desirable quality of flexibility needed to surround all shape configurations and combinations of items.

The deficiencies of the second category of conventional racks, confined to structured items, is solved with the hardware, and bed rail combination. The desirable qualities of tension, flexibility, durability, and security are preserved and adapted to the exact spot on the platform that the item requires to be successfully restrained. Solid load-shifting prevention is achieved. The simplicity of this invention's design should also be noted. It falls well within the ability of anyone to quickly grasp and understand the nature of its operation.

It is a further object of this invention to provide for the requirements needed for transporting rigid conduit and piping, that quickly and easily snaps into place when needed. When not needed, it is easily removed from the platform, restoring aerodynamic flow.

It is a further object of this invention, when mounted to the top of a cargo bed cap, to introduce cradling devices for suspending a wide range of tools and materials from the ceiling of the cap and utilize what is normally wasted space.

It is a further object of this invention to be mounted conventionally to a pickup truck using supports on an open cargo bed.

It is a further object of this invention to also utilize favorable machining characteristics of its aluminum side rails to display enhancement and appearance design schemes to improve and personalize the appearance of the truck as is achieved with custom wheels.

It is a further object of this invention to prevent theft of items from the platform with hardware having provisions for a lock to prevent operation of the hardware.

DESCRIPTION OF THE PREFERRED EMBODIMENTS

Figure 1A:
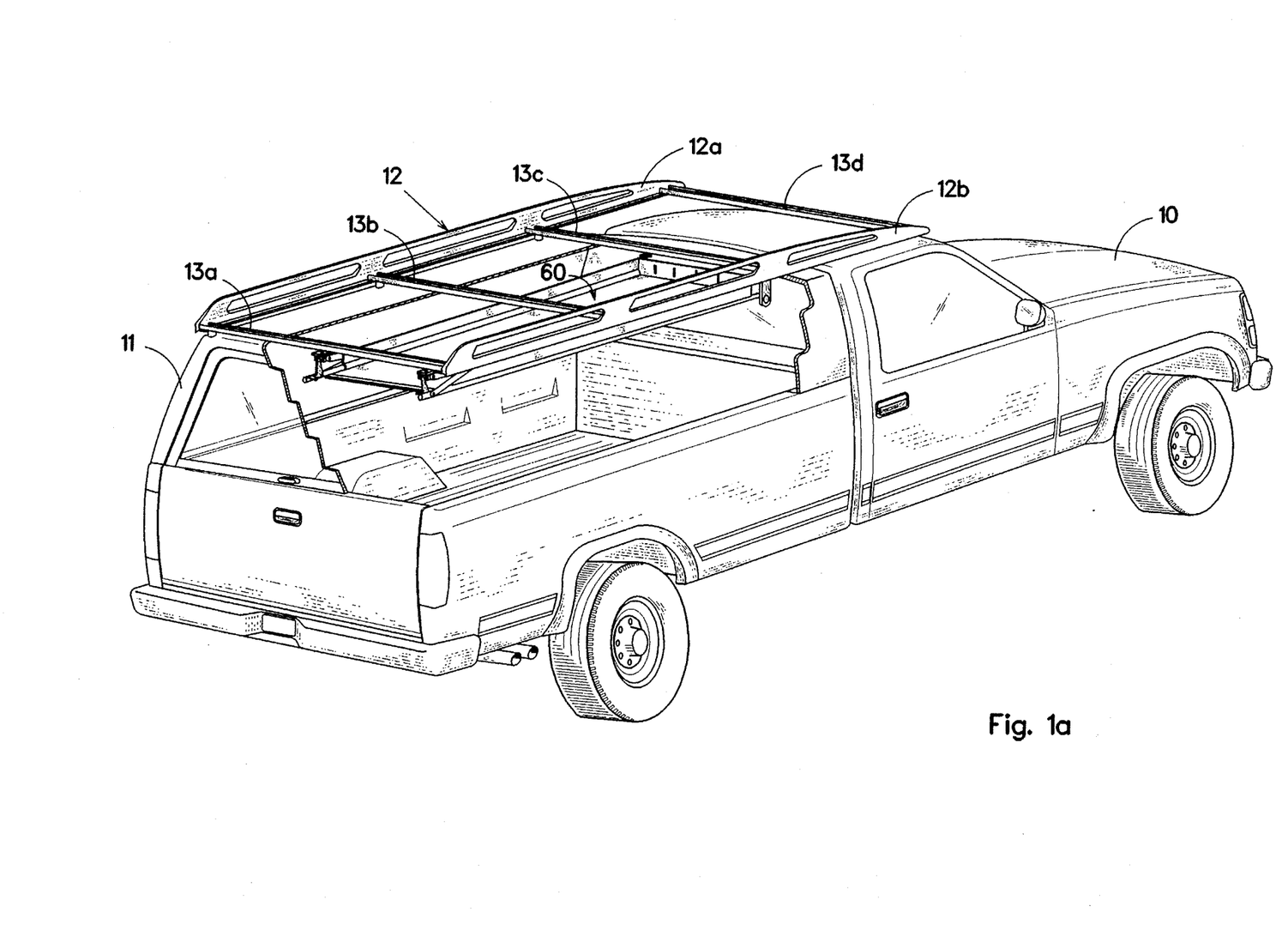
FIG. 1a shows a perspective view of the two major components of the invention, with a portion of the cap cut away, to show the second component.

Referring to the drawings FIG. 1a, shown is a conventional pickup truck or truck 10 to which is fitted a cargo cap 11. Fitted to the cap is the restraining platform or platform 12 of the invention. The platform 12 includes two side rails 12a and 12b, and in this case four convoluted bed rails 13a, 13b, 13c, and 13d. More may be added if desired. The cargo cap 11 is cut away to more clearly illustrate a cradling device 60 of the invention and a related position to the platform 12 and locations where the cradle 60 mates with the mounting bolts (not shown) of the platform 12.

Figure 2A:
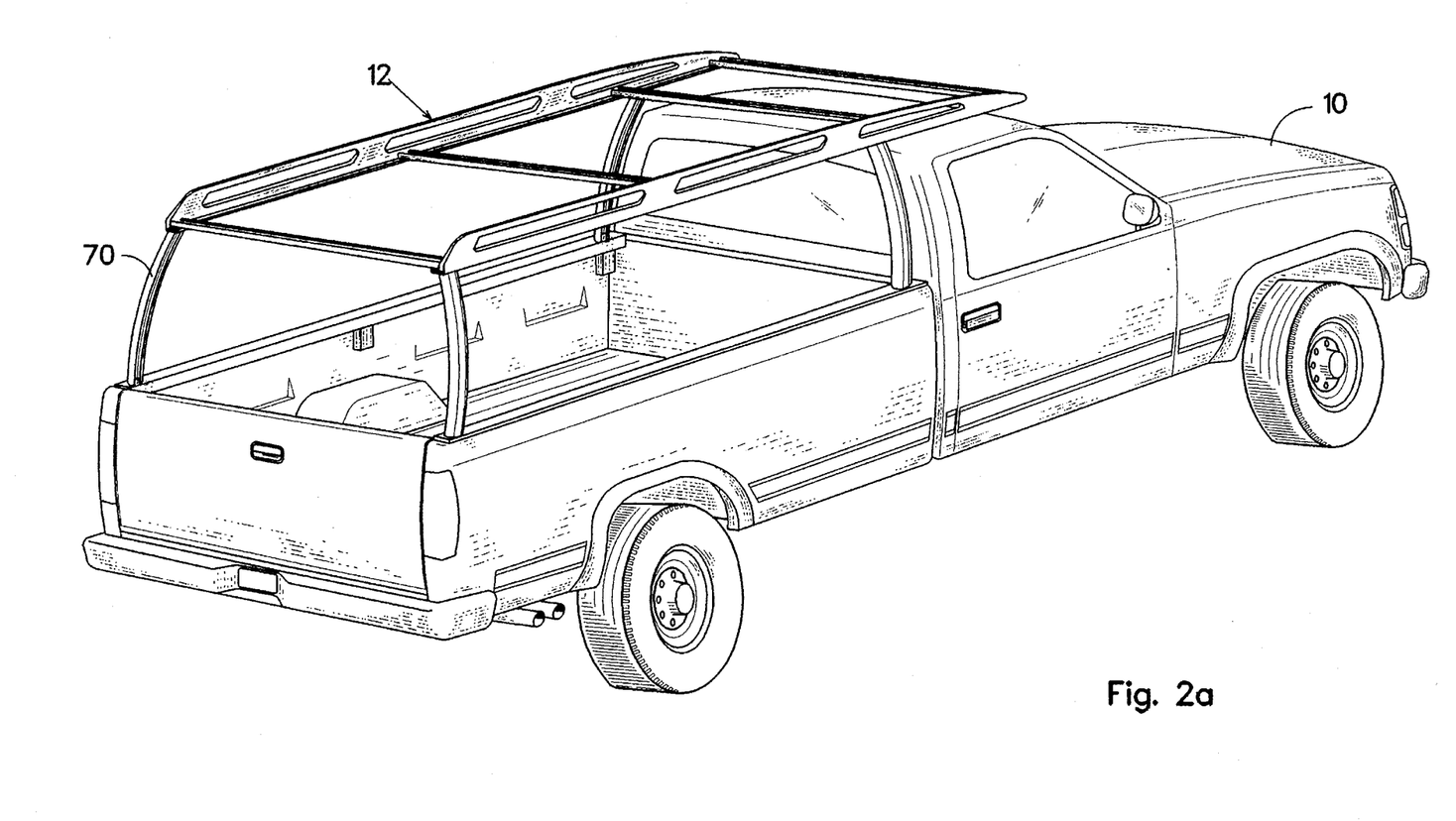
FIG. 2a shows a perspective view of the open bed version.

Referring now to FIG. 2a, where shown is the pickup truck 10 and to which the platform 12 is fitted with supports 70 to accommodate individuals who do not wish to have a cargo cap.

Figures 3A, 4A, 4B, 4C, 4D, 4E:
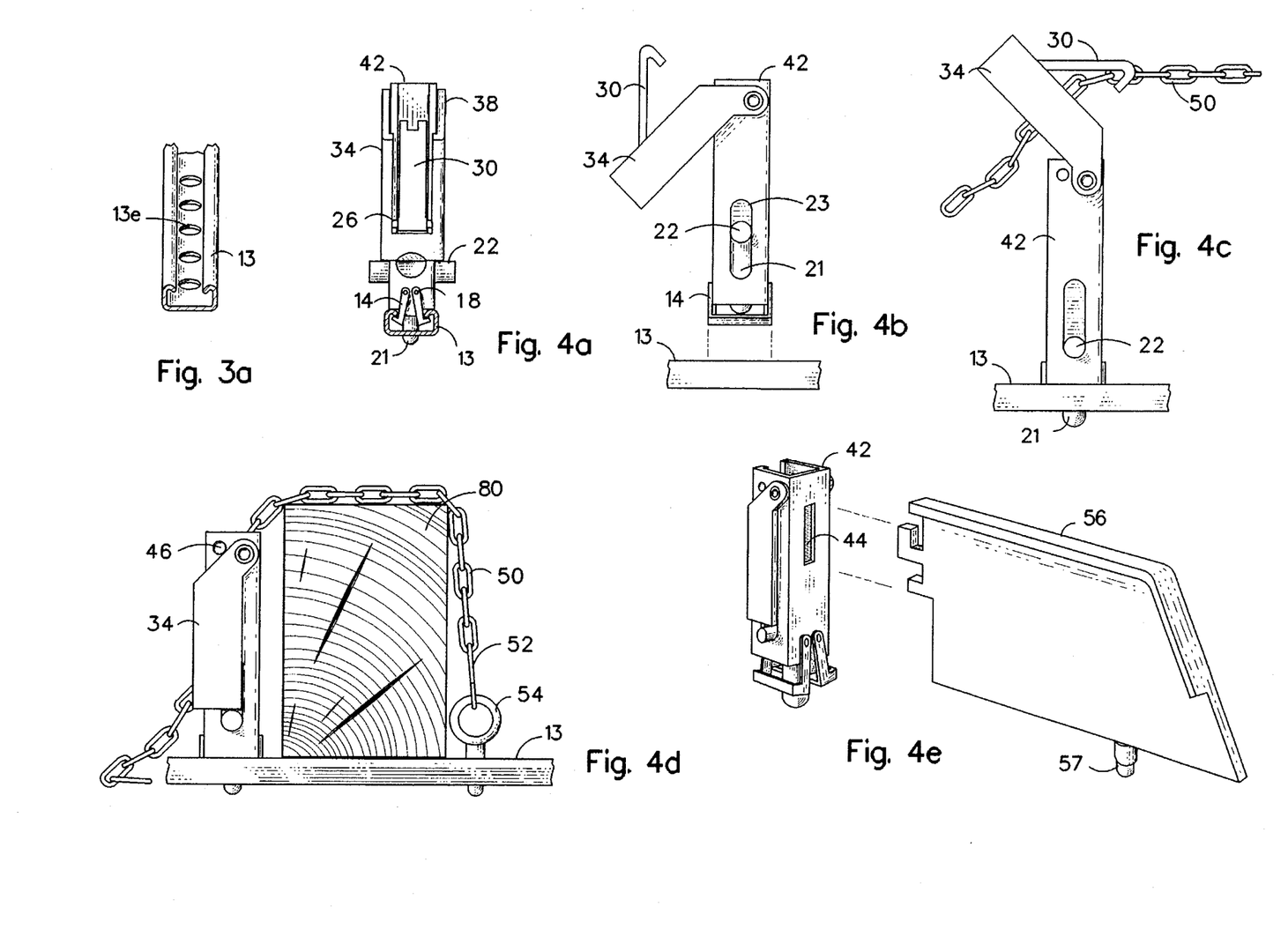
FIG. 3a shows a perspective end view of the convoluted bed rails configuration.
FIG. 4a shows a side view of the hardware base engaged in a bed rail.
FIG. 4b shows a side view of the base and the position of the center pin and tension lever when removing and inserting the base.
FIG. 4c shows a side view of the base and tension lever prepared to engage the chain link.
FIG. 4d shows an end view of the hardware base, chain, and anchor eyelet all engaged as one possible use configuration, in this case a wooden beam.
FIG. 4e shows a prospective view of the forward conduit abutment plate.

Referring now to FIG. 3a, where shown is an end view of the convoluted bed rail 13 and its configuration which includes perforations 13e that continue its entire length and into which a hardware base 42 is received see (FIG. 4a). Referring now to FIGS. 4a–4e, the parts of the hardware base 42 are shown. A center actuation pin 21 is screwed into a top piece forming the T-shaped actuation pin 22 and is positioned between wedges 14 on dowel pins 18. A slack lever 34 is attached to the base 42 by axle pins 38 and upon the slack lever 34 is attached a slotted chain hook 30 on an axle pin 26.

Referring now to FIG. 4b, is a view of a traverse slot 23 in the sides of the base 42 in which the top of the center actuation pin 22 is guided in its travel. The slack lever 34 has been rotated open permitting the center actuation pin 21 to be lifted for removing and inserting the base 42. Referring to FIG. 4c, a predetermined length of chain link 50 is positioned to engage the chain hook 30 and falls through the body of the base 42.

Figure 4F:
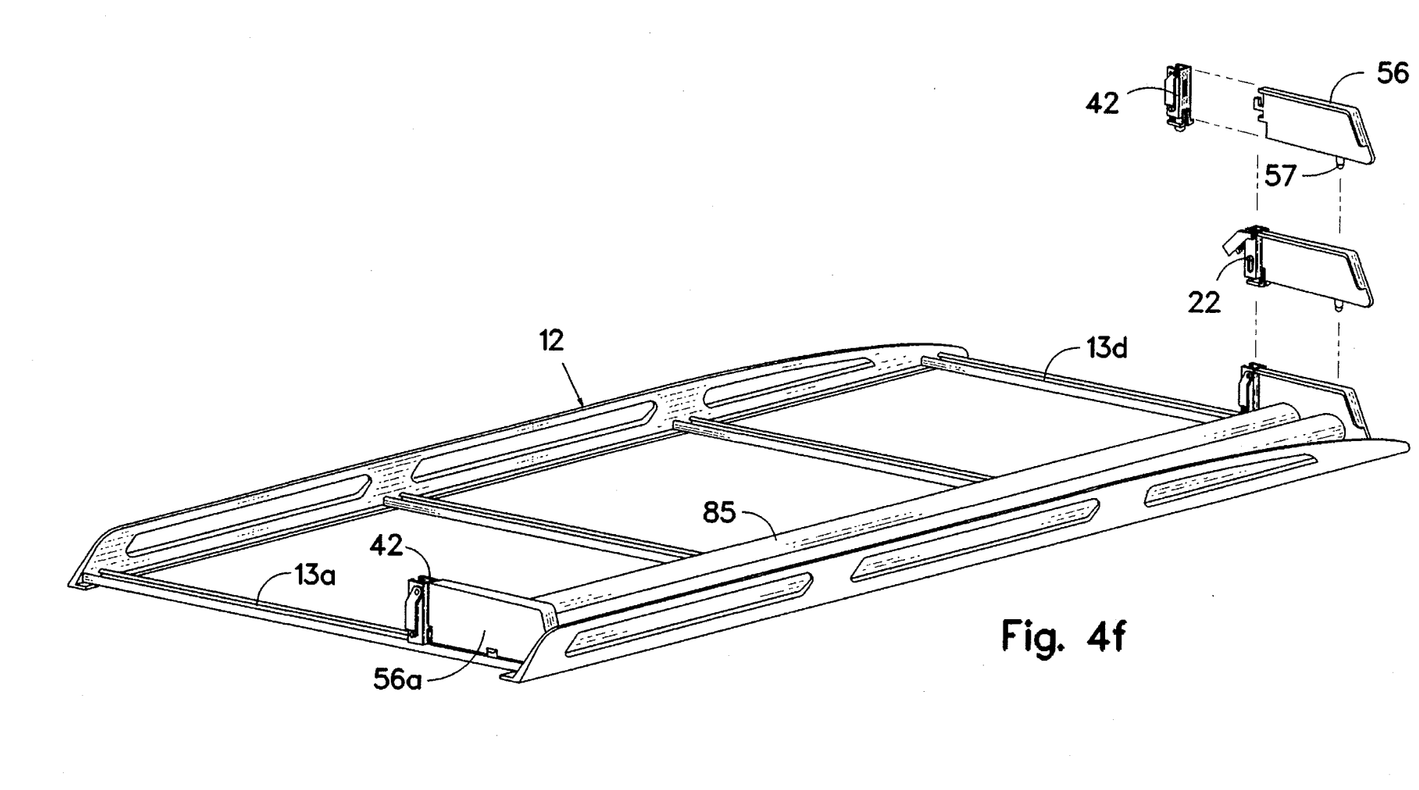
FIG. 4f shows a prospective view of the conduit abutment plates installed for transporting conduit.

Referring now to FIG. 4d, a hole 46 in the base 42 is positioned to receive a lock (not shown) directly adjacent the slack lever 34. The chain link 50 is attached to an eyelet 54 by a hook 52. Referring now to FIG. 4e, the base 42 is positioned to receive, in an adapter slot 44, a front conduit butt plate 56 with a perforation stud 57. Referring now to FIG. 4f, shown is the platform 12 with a front conduit butt plate 56 inserted in a base 42 and inserted in bed rail 13d and a rear conduit butt plate 56a inserted in a base 42, and inserted into bed rail 13a and in which conduit 85 is contained and restrained. This hardware configuration is easily and quickly removed from the platform 12 when not needed, which reduces drag.

Eyelet 54 is a standard threaded stud (for example, available from UNI-STRUT) with the eyelet on top and a flanged cap on the other (flange not shown). Threaded onto the stud portion of the eyelet 54 is an elongated nut (not shown) configured to fit inside the convoluted channel of the bed rail 13. When the eyelet 54 is inserted into the bed rail 13, the narrower sides of the nut allow passage of the nut into the cavity of the channel. Clockwise rotation of the eyelet 90 degrees rotates the nut until its elongated ends engage the inside walls of the channel stopping the rotation of the nut. Several more turns of the eyelet 54 force the nut upward engaging the underside of the convoluted edges of the channel. Continued rotation of the eyelet 54 builds pressure between the flange of the cap on the floor of the channel and the nut on the convoluted edges of the bed rail 13 firmly securing the eyelet 54 to the platform 12.

Figure 5A:
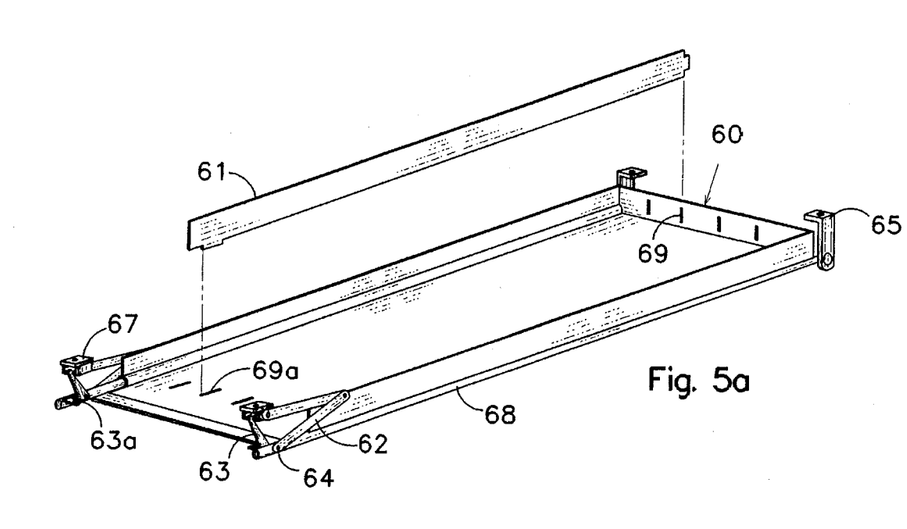
FIG. 5a shows a prospective view of the main cradle with a divider option.

Referring now to FIG. 5a, a cradle 60 is shown with a divider option 61 which is positioned into divider receiving slots 69 and 69a. A hinge 65 is fastened through the side of a tubular frame 68 and also attaches the rear of the cradle 60 to platform 12 mounting bolts (not shown). A pair of lowering arms 62 are attached to a forward mount and striker 67 which attaches the access end of the cradle 60 to the platform 12 mounting bolts (not shown).

The cradle 60 is held in the closed position by a latch 63 for the right hand and 63a for the left. A threaded axle pin 64 attaches the latches 63 and 63a to the inward side of the frame 68 and a pair of lowering arms 62 on the outward side of the frame 68 and is secured to the threaded axle pin 64 with a nut (not shown).

Figure 5B:
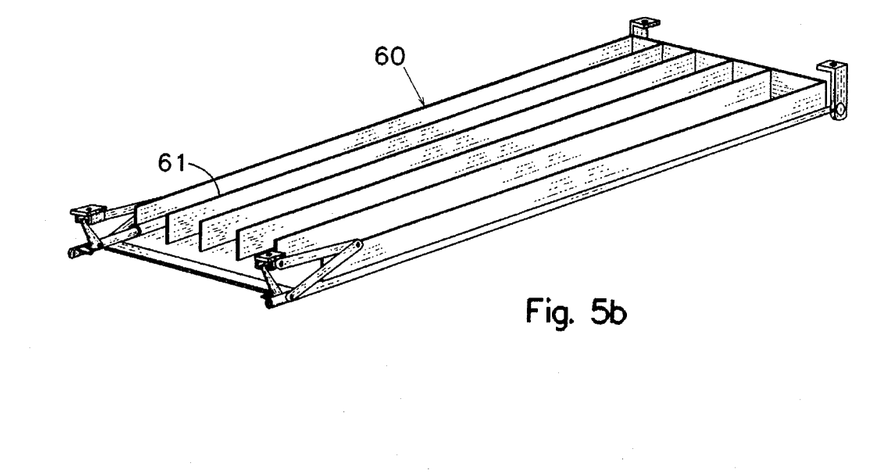
FIG. 5b shows a prospective view of the main cradle fully partitioned.
Figure 5C:
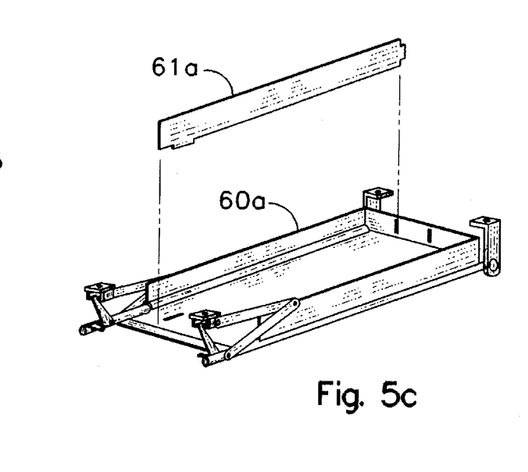
FIG. 5c shows a perspective view of a half cradle option.
Figure 5D:
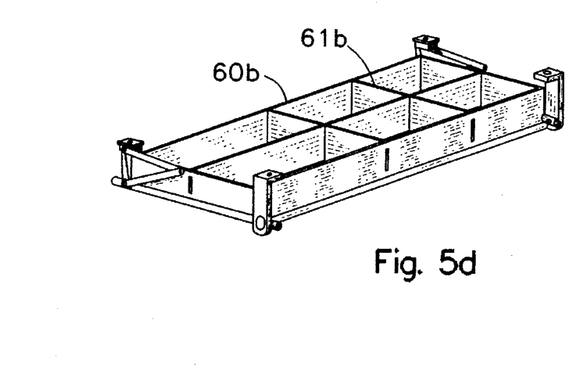
FIG. 5d shows a perspective view of a side access small parts cradle.
Figure 5E:
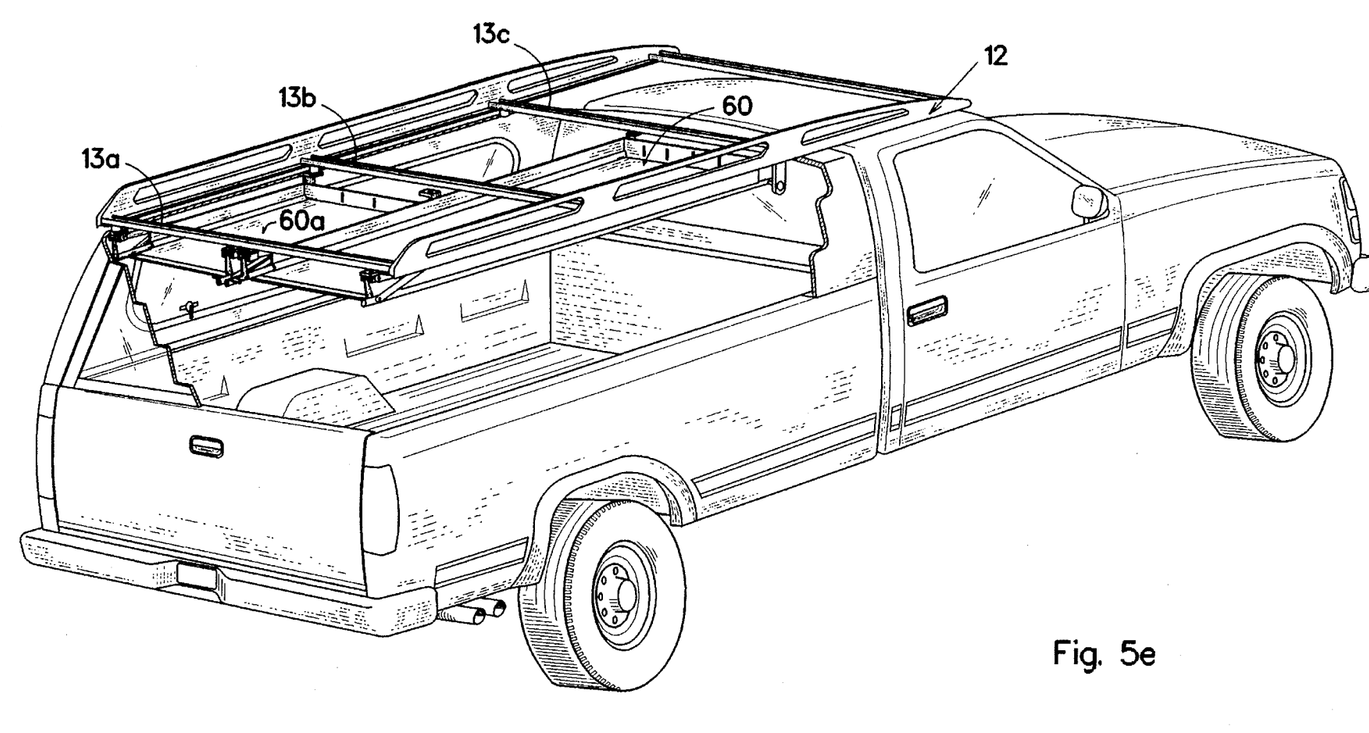
FIG. 5e shows a perspective view of the half and full cradles mounted.
Figure 6A:
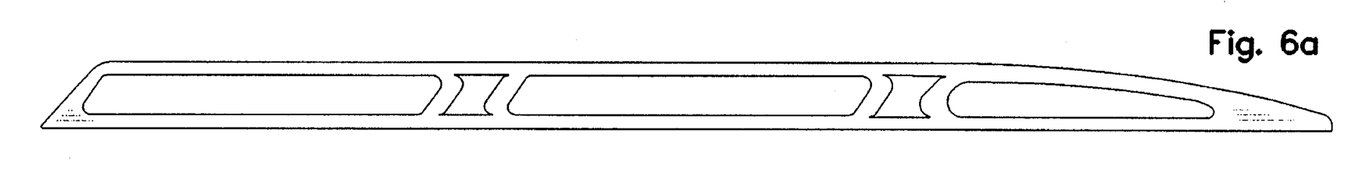
FIGS. 6a–6d shows side rails appearance displaying potential.
Figure 6B:
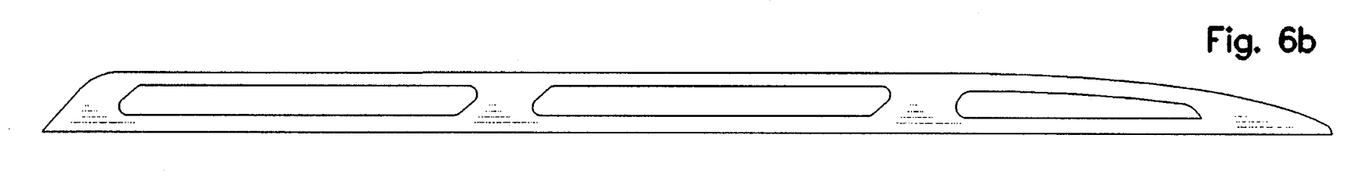
Figure 6C:
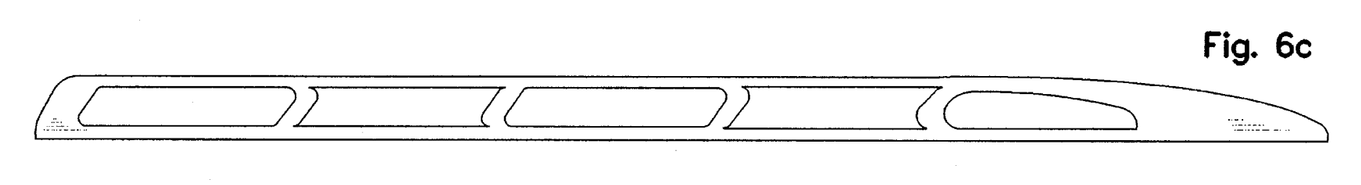
Figure 6D:
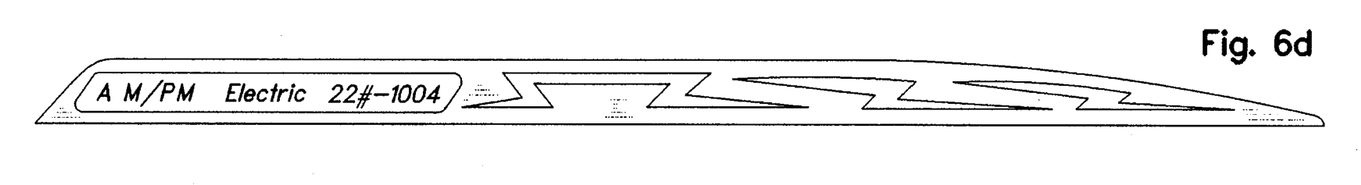

Referring now to FIG. 5b, a fully outfitted cradle 60 is shown. The dividers 61 can be added as needed. Referring now to FIG. 5c, shown is a half cradle 60a and a divider option 61a. The same mounting hardware as used on cradle 60 is used on 60a. Referring to FIG. 5d, shown is a side access small parts cradle 60b with divider option 61b. Again, the same mounting hardware as cradle 60 is used. Referring now to FIG. 5e, shown are the various cradle locations possible in mounting the cradles, in this case, 60, and 60a, to the platform 12. As revealed the half cradles 60a and 60b (not shown) mount to the middle bed rail 13b and bed rails 13a and 13c, where as cradle 60 mounts to bed rails 13a and 13c. This configuration can flip if desired to have cradle 60 on the driver side and the half cradles 60a on the passenger side. Referring now to FIGS. 6a–6d, in which is shown the intended use for the side rail material of aluminum into which is produced various appearance enhancement schemes, such as repeating patterns, company logo advertising, and custom features for truck enhancement.

While the previous descriptions contain many specifications, these should not be construed as limitations on the scope of the invention, but rather exemplifications of preferred embodiments thereof. It is obvious that modifications and changes therein may be made by those skilled in the art without departing from the spirit and scope of the invention, as described by the claims appended hereto.

What is claimed as invention is:

1. A tool and material restraining platform for pickup trucks comprising;

a pair of side rails;

a load bearing bed rail arranged perpendicular to the side rail, said bed rails formed of extruded material formed into a convoluted, upwardly open channel;

attachment means for securing the bed rail to the side rails;

a self-locking base comprising a t-shaped actuation pin and a pair of wedges, the vertical shaft of said pin being located in one of a plurality of openings in the bed rail, said wedges being spread apart by the actuation pin when the pin is in a lowermost position, causing the wedges to be separated and secure the base in the convoluted bed rail, said wedges release from the bed rail when the bin is raised from the lowermost position, said base further comprising a lever arm arranged to block upward movement of the pin when in a closed position, thereby securing the base to the bed rail;

said base further comprising a continuous length of chain secured by a hook on the lever arm, one end of the chain being further secured to holding means on the bed rail;

whereby the lever arm, the holding means and the chain cooperate to produce tension around a load on the bed rail and whereby the lever arm, wedges and pin retain the base in the bed rail.

2. The tool and material restraining platform for pickup trucks of claim 1 wherein said platform is mounted to the top of a cargo bed cap on the truck and said platform further comprises;

mounting means for securing the platform to the cap, said mounting means further comprises means to suspend a cradling member from the ceiling on the inside of the cap;

said cradling member comprising a shallow container having hinges attached at an end and latching means at another end.

3. The tool and material restraining platform for pickup trucks of claim 1 wherein said platform comprises mounting means for mounting to supports on an open bed truck.

4. The tool and material restraining platform for pickup trucks of claim 1 wherein the base further comprises a hole adjacent to the lever and a locking means inserted through the hole to prevent movement of the lever from the lowermost position.

5. The tool and material restraining platform for pickup trucks of claim 1 further comprising an abutment plate at each end of the platform arranged parallel to the bed rail to contain and restrain conduit on the platform, said base comprising apertures and said plat comprising projections removably inserted in the apertures.

6. The tool and material restraining platform for pickup trucks of claim 1 wherein the side rails are formed of aluminum.

7. The tool and material restraining platform for pickup trucks of claim 1 wherein the side rails are adapted for advertizing.

8. The tool and material restraining platform for pickup trucks of claim 1 wherein the bed rail is formed of steel.

* * * * *